(12) United States Patent
Lee et al.

(10) Patent No.: US 11,467,081 B2
(45) Date of Patent: Oct. 11, 2022

(54) PARTICLE DETECTION DEVICE AND DETECTION METHOD

(71) Applicant: NANJING YITIAN BIOTECHNOLOGY CO., LTD., Nanjing (CN)

(72) Inventors: Chen-Yi Lee, Nanjing (CN); Chao-Hong Chen, Nanjing (CN); Chun-Kai Chiang, Nanjing (CN); Yi Lu, Nanjing (CN)

(73) Assignee: NANJING YITIAN BIOTECHNOLOGY CO., LTD., Nanjing (CN)

( * ) Notice: Subject to any disclaimer, the term of this patent is extended or adjusted under 35 U.S.C. 154(b) by 335 days.

(21) Appl. No.: 16/639,117

(22) PCT Filed: Aug. 30, 2018

(86) PCT No.: PCT/CN2018/103116
§ 371 (c)(1),
(2) Date: Feb. 13, 2020

(87) PCT Pub. No.: WO2019/205402
PCT Pub. Date: Oct. 31, 2019

(65) Prior Publication Data
US 2020/0209139 A1 Jul. 2, 2020

(30) Foreign Application Priority Data
Apr. 25, 2018 (CN) .......................... 201810381143.X

(51) Int. Cl.
*G01N 15/10* (2006.01)
*B01L 3/00* (2006.01)

(52) U.S. Cl.
CPC .... *G01N 15/1031* (2013.01); *B01L 3/502715* (2013.01)

(58) Field of Classification Search
CPC ........... G01N 15/1031; G01N 15/1056; G01N 15/1404; G01N 2015/1413;
(Continued)

(56) References Cited

U.S. PATENT DOCUMENTS 9,333,502 B1 * 5/2016 Ayliffe ............... G01N 15/1484
9,915,599 B2 3/2018 Brun et al.
(Continued)

FOREIGN PATENT DOCUMENTS

CN 1464909 A 12/2003
CN 1838999 A 9/2006
(Continued)

OTHER PUBLICATIONS

Translation of EP3465224 which is equivalent to WO2017029893A1 (Year: 2017).*
(Continued)

*Primary Examiner* — Christopher P McAndrew
(74) *Attorney, Agent, or Firm* — ParkerHighlander, PLLC.

(57) ABSTRACT

A device and method for detecting particles by using electrical impedance measurement, in particular, relating to an improved electrical impedance measurement microfluidic chip and an improved particle detection method. The device comprises a sample injection part, a main channel (4) and an electrical impedance detection part. By means of said device and method, the present invention can accurately distinguish, detect and count different particles.

17 Claims, 5 Drawing Sheets

(58) Field of Classification Search
CPC ....... G01N 2015/1006; B01L 3/502776; B01L 3/502715; B01L 2300/0816; B01L 2300/0874; B01L 2400/0487
USPC ...................................................... 324/71.4
See application file for complete search history.

(56) References Cited

U.S. PATENT DOCUMENTS

| | | | |
|---|---|---|---|
| 2004/0033483 | A1 | 2/2004 | Oka et al. |
| 2005/0266298 | A1 | 12/2005 | Mitchell et al. |
| 2009/0301883 | A1 | 12/2009 | Chung et al. |
| 2012/0142032 | A1 | 6/2012 | Morgan et al. |
| 2012/0258488 | A1* | 10/2012 | Abilez .................. C12M 47/04 435/287.1 |
| 2014/0377852 | A1* | 12/2014 | Putnam ............ G01N 35/00029 422/63 |
| 2015/0377763 | A1 | 12/2015 | Brun et al. |
| 2020/0086320 | A1 | 3/2020 | Lee et al. |

FOREIGN PATENT DOCUMENTS

| | | | |
|---|---|---|---|
| CN | 101046458 | A | 10/2007 |
| CN | 101201350 | A | 6/2008 |
| CN | 101441186 | A | 5/2009 |
| CN | 102099666 | A | 6/2011 |
| CN | 102128777 | A | 7/2011 |
| CN | 102401760 | A | 4/2012 |
| CN | 102460114 | A | 5/2012 |
| CN | 102530834 | A | 7/2012 |
| CN | 102866193 | A | 1/2013 |
| CN | 103175950 | A | 6/2013 |
| CN | 103323383 | A | 9/2013 |
| CN | 103439241 | A | 12/2013 |
| CN | 203337513 | U | 12/2013 |
| CN | 104061969 | A | 9/2014 |
| CN | 203947103 | U | 11/2014 |
| CN | 104195028 | A | 12/2014 |
| CN | 104697917 | A | 6/2015 |
| CN | 104969063 | A | 10/2015 |
| CN | 204878137 | U | 12/2015 |
| CN | 205120654 | U | 3/2016 |
| CN | 106093146 | A | 11/2016 |
| CN | 106215984 | A | 12/2016 |
| CN | 106492891 | A | 3/2017 |
| CN | 106769698 | A | 5/2017 |
| CN | 106925358 | A | 7/2017 |
| CN | 107045068 | A | 8/2017 |
| CN | 107189929 | A | 9/2017 |
| CN | 107583695 | A | 1/2018 |
| CN | 108344678 | A | 7/2018 |
| CN | 108387488 | A | 8/2018 |
| CN | 110823787 | A | 2/2020 |
| DE | 2412165 | A1 | 9/1975 |
| WO | WO-2014/036915 | A1 | 3/2014 |
| WO | WO-2014/122873 | A1 | 8/2014 |
| WO | WO-2015/164847 | A1 | 10/2015 |
| WO | WO-2017/055581 | A1 | 4/2017 |
| WO | WO-2017/202932 | A2 | 11/2017 |
| WO | WO-2018/035602 | A1 | 3/2018 |

OTHER PUBLICATIONS

Chinese Office Action for CN Application 201810169100.5, 15 pages (dated Mar. 11, 2019).
Chinese Office Action for CN Application 201810169100.5, 14 pages (dated Nov. 18, 2019).
Chinese Office Action for CN Application 201810381143.X, 23 pages (dated Mar. 2, 2020).
International Search Report for PCT/CN2018/103116, 6 pages (dated Jan. 8, 2019).
International Search Report for PCT/CN2018/103171,14 pages, English translation, (dated Jan. 15, 2019).
Scott, R et al., Three-dimensional hydrodynamic focusing in a microfluidic Coulter counter, Review of Scientific Instruments, 79(4):046104.1-046104.3 (2008).
Written Opinion for PCT/CN2018/103116, 3 pages (dated Jan. 8, 2019).
Written Opinion for PCT/CN2018/103171, 3 pages, (dated Jan. 15, 2019).
Chinese Office Action for CN Application 201810381143.X, 9 pages (dated Nov. 25, 2020).
Song, H. et al., Identification of Mesenchymal Stem Cell Differentiation State Using Dual-micropore Microfluidic Impedance Flow Cytometry, Anal. Methods, 1-13 (2016).

* cited by examiner

PARTICLE DETECTION DEVICE AND DETECTION METHOD

CROSS REFERENCE OF RELATED APPLICATION

This application is the national phase of International Application No. PCT/CN2018/103116, titled with "PARTICLE DETECTION DEVICE AND DETECTION METHOD", which claims the priority of Chinese Patent Application No. 201810381143.X, filed on Apr. 25, 2018, and titled with "PARTICLE DETECTION DEVICE AND DETECTION METHOD", and the disclosures of which are hereby incorporated by reference.

FIELD

The present disclosure relates to a device and a method for detecting particles that takes advantage of impedance, especially relates to an improved impedance detection microfluidic chip and an improved method for detecting particles.

BACKGROUND

Impedance measurement techniques are mostly conducted by focusing particles to be a single particle flow using microfluidic chip or electric field, before passing through the measuring electrode, followed by detecting and counting of the particles based on the impeding and resisting effect of the particles on the measuring voltage or current. However, when a sample (such as blood) is actually detected, since the size of target particles (such as circulating tumor cells, CTCs) is equivalent to the size of non-target particles such as blood cells (especially white blood cells such as macrophages and monocytes), the impedance signals are fairly close, making it difficult to distinguish the different kind of particles solely based on the impedance signal. Therefore, additional cell labeling means to distinguish target particles such as fluorescence staining on target particles (such as cells) or use of detecting antibodies are usually required, which at the same time incurs additional steps and costs. As a result, there is an urgent need in the art for an impedance detection technique capable of distinguishing different kinds of particles without the addition of any markers.

SUMMARY

Through long-term study on the microfluidic chip technology, the inventor finds that using a sheath liquid to pack the target sample flow is able to focus the particle flow in the horizontal direction. However, there is no effective restriction in the vertical direction, causing some of the particles to distribute unevenly in the vertical direction. When the particles pass through the detection electrode, the detection signal of the same particle generated by the detection electrode is not constant, and the differences between detection signals of different particles are weaken, so that the confidence value of the detection result based only on the peak value of detection signal is low.

The inventor finds that through changing the structure at the joint of the sheath fluid channel and the sample channel by setting the height of the sheath fluid channel to be greater than the height where sheath fluid flows into the main channel, so as to form a stepped design, when the sheath fluid enters the joint position, the sheath fluid will not only flow in the horizontal direction, but also move in the direction perpendicular to the surface of the chip. After converging with the sample channel, the sheath fluid would create a pressure both horizontally and vertically on the sample fluid flowing in the horizontal direction, producing an effect of three-dimensional focusing. The three-dimensional focusing not only focus the particles in the horizontal direction, but also cause the particles to be closer to the lower side or upper side of the main channel, thereby being closer to the impedance measurement electrode, leading to more stable detection signals than those of samples only subjected to horizontal focusing.

Furthermore, when analyzing the signal generated by impedance measurement electrode, the inventor unexpectedly finds that if the ratio of resistance and capacitive reactance of the particles, i.e., $R/X_C$ value, is used, better discrimination will be achieved, and target particles can be more effectively detected.

In one aspect, the present disclosure relates to a microfluidic chip for detecting particles, comprising an inlet unit, a main channel (4) and an impedance detection unit.

In one embodiment, the inlet unit comprises one or more sample channels (1), and one or more sheath fluid channels (2), such as 1, 2 or 3 sample channels and 1, 2, 3, 4, 5 or 6 sheath fluid channels, and for more example, one sample channel and two sheath fluid channels, and the one or more sample channels (1) and one or more sheath fluid channels (2) converge at one end to form a convergence chamber (3), and the convergence chamber (3) is connected with the main channel (4), so that a sample flow and a sheath fluid flow converge and then flow into the main channel (4); and the impedance detection unit comprises an impedance measurement electrode (5), which is disposed on the top or the bottom of the main channel (4), being able to generate an impedance detecting signal in response to the particles flowing through the main channel (4) and.

In another embodiment, wherein at the interface between the convergence chamber (3) and the main channel (4), the convergence chamber (3) has a greater height than that of the main channel (4), so that when the sheath fluid flows into the main channel (4) from the sheath fluid channel (2) and through the convergence chamber (3), a flow perpendicular to the direction of the surface of the chip is generated.

In another embodiment, wherein the top surface of the convergence chamber (3) is higher than that of the main channel (4), so that when the sheath fluid flows into the main channel (4) from the sheath fluid channel (2) and through the convergence chamber (3), a downward flow is generated.

In another embodiment, wherein the bottom of the convergence chamber (3) is lower than that of the main channel (4), so that when the sheath fluid flows into the main channel (4) from the sheath fluid channel (2) and through the convergence chamber (3), a upward flow is generated.

In another embodiment, wherein the height of the sheath fluid channel (2) is substantially the same as or slightly greater than that of the convergence chamber (3).

In another embodiment, wherein the height of the sample channel (1) is substantially the same as or slightly greater than that of the main channel (4).

In another embodiment, wherein the ratio of the height of the convergence chamber (3) to the main channel (4) is (1.5~5):1, preferably (1.5~3):1, such as 2:1.

In another embodiment, wherein the impedance measurement electrode (5) is disposed at the bottom of the main channel (4), and preferably disposed on the substrate of the chip.

In another embodiment, wherein the impedance measurement electrode (5) is disposed at the bottom of the main channel (4), and preferably disposed on the cover plate that covers the substrate of the microfluidic chip.

In another embodiment, the impedance detection unit comprises 2~8 groups of electrodes, such as 2, 3, 4, 5, 6, 7 or 8 groups of electrodes, wherein each group may comprises two or three electrodes arranged in some configuration. In the two-electrode configuration, a signal electrode and a receiving electrode are successively provided; in the three-electrode configuration, a forward signal receiving electrode, a signal electrode and a reverse signal receiving electrode are successively provided. Each group of electrodes is used to determine the various characteristics based on different amplitudes and frequencies.

In the second aspect, the present disclosure relates to an impedance detection device for detecting particles, comprising the microfluidic chip according to any one of the above embodiments.

In one embodiment, the impedance detection device further comprises an impedance signal receiver connected to the impedance detection unit, and preferably comprising a sample injector connected to the inlet unit and/or the impedance signal analyzer connected to impedance receiver.

In the third aspect, the present disclosure relates to a method for detecting particles, which uses the microfluidic chip according to the first aspect and/or the impedance detection device according to the second aspect.

In one embodiment, comprising a) injecting the test sample and sheath fluid into the inlet unit respectively through the sample channel (1) and the sheath fluid channel (2), respectively, for example, the sample is derived from whole blood, plasma, urine, tissue fluid, cerebrospinal fluid, cell culture fluid or cell mixture; specifically, the sheath fluid is a sucrose PBS solution, and preferably, the sheath fluid comprises 280 mM sucrose, 137 mM NaCl, 2.7 mM KCl, 4.3 mM $Na_2HPO_4$ and 1.47 mM $KH_2PO_4$, having a pH of 7.4; preferably, the conductivity of the sheath fluid is 30~500 mS/m, and more preferably, the conductivity of the sheath fluid is 150 mS/m;

b) Detecting the impedance signal of the flowing-through particles with impedance detection unit; and c) analyzing the impedance signal obtained in step b) to distinguish the target particles from non-target particles, and the target particles are tumor cells, more preferably circulating tumor cells.

In another embodiment, wherein in step c), the analysis comprises calculating the ratio of resistance (R) to capacitive reactance ($X_C$) of the particles, i.e. $R/X_C$, based on the impedance signals obtained in step b), so as to distinguish target particles from non-target particles.

In another embodiment, wherein the ratio of sample flow to the sheath fluid flow is 1:1~1:10, such as 1:1, 1:2, 1:3, 1:4, 1:5, 1:6, 1:7, 1:8, 1:9 or 1:10.

In the fourth aspect, the present disclosure relates to the microfluidic chip according to the first aspect and the impedance detection device according to the second aspect, which is used for detecting tumor cells, especially the tumor cells are circulating tumor cells.

In the fifth aspect, the present disclosure relates to the microfluidic chip according to the first aspect and the impedance detection device according to in the second aspect, which is used for preparing medical device for detecting tumor cells, especially the tumor cells are circulating tumor cells.

BRIEF DESCRIPTION OF THE DRAWINGS

The foregoing and other aspects of the present disclosure are clearly described hereinafter through the detailed description and the accompanying drawings of the present disclosure. For illustrating the present disclosure with examples, the embodiments of the present disclosure are presently preferred, but it is understandable that the present disclosure is not limited to the specific embodiments disclosed.

DETAILED DESCRIPTION

Microfluidic Chip

Figure 1:
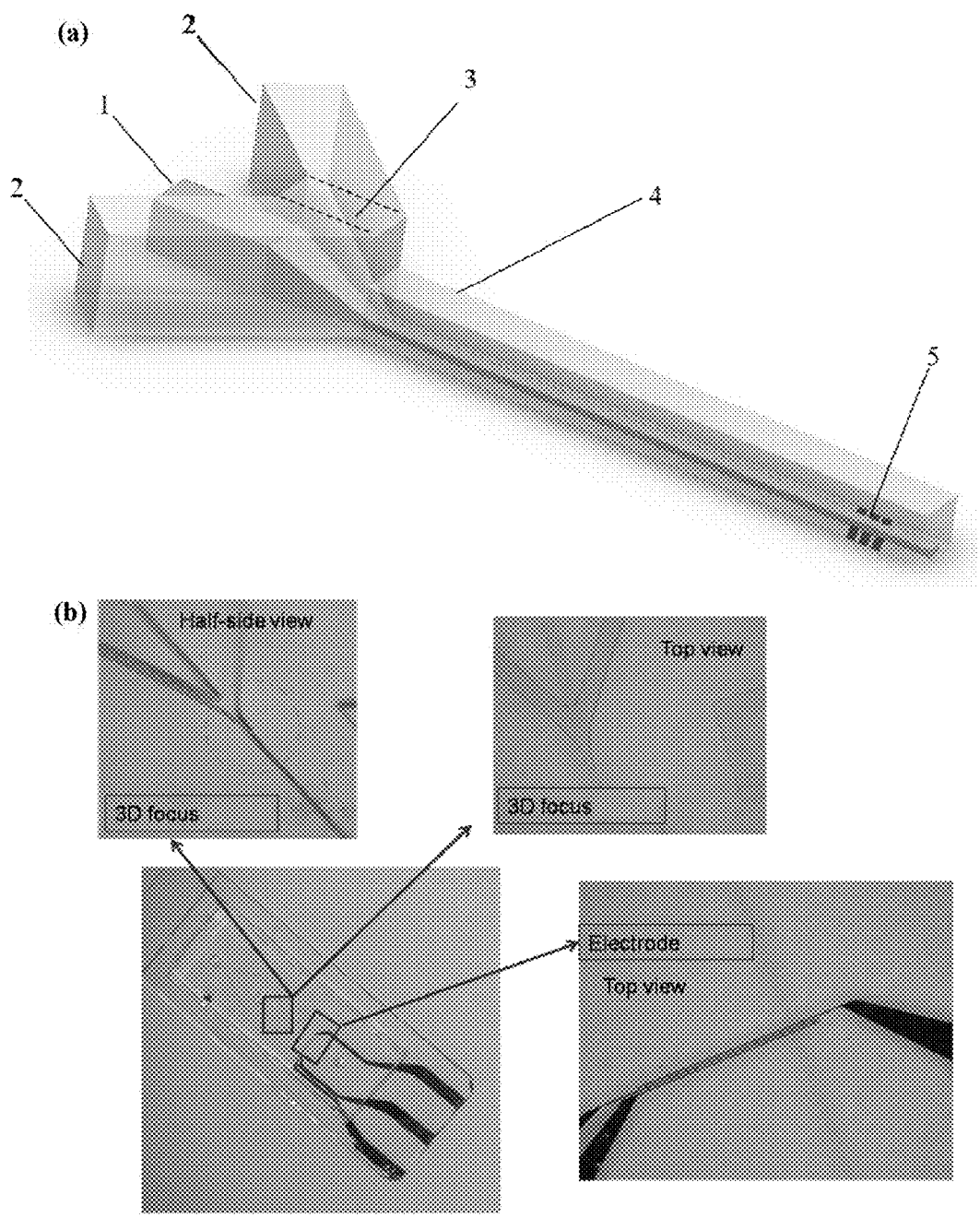
FIG. 1a is a schematic diagram of the microfluidic chip in one embodiment of the present disclosure.
FIG. 1b is a pictorial diagram of the microfluidic chip in one embodiment of the present disclosure.

Microfluidic chip, which is also known as lab on a chip or microfluidics, integrate each basic operating unit of a specific operation process on a chip of several square centimeters with micrometer-scale channel structure. In the present disclosure, "microfluidic chip", "microfluidics" and "chip" have the same meaning when referring to microfluidic chip, and may interchange with each other. Microfluidic chip may only comprise a substrate integrating the channel and/or electrode, or may comprise both a substrate and a cover plate, wherein the electrode may be integrated on the cover plate and the cover plate may form channels along with the substrate as well. Components such as the sample channel (1), the sheath fluid channel (2), the main channel (4), and the impedance measurement electrode (5) are integrated on the substrate and/or cover plate, and may be prepared by conventional process in the art, such as photolithography and etching method, etc. The sizes and relative proportions of each component are customized by one of ordinary skill in the art according to the size of the substrate and/or the cover plate, as well as the size of the target particle. In an exemplary embodiment of the present disclosure, the sample channel (1) has a width of 60 μm; the main channel has a width of 125 μm, and a height of 120 μm.

In the present disclosure, the material of the microfluidic chip may be selected from any conventional materials, such as any appropriate rigid material and/or elastic material. The rigid material may be inorganic rigid material such as monocrystalline silicon, amorphous silicon, glass, quartz, etc., or may be rigid organic material such as epoxy resin, polyurea, polyurethane, polystyrene, polymethyl methacrylate, etc. The appropriate elastic material mainly comprises polydimethylsiloxane (PDMS) and polymethyl methacrylate (PMMA).

In the present disclosure, the microfluidic chip may be connected to external device directly through medium, such as conduit, wire, etc. to achieve the desired functions. For example, device such as the injection pump or automatic sample injector is connected to the sample channel for continuously or automatically injecting the sample and/or sheath fluid; the impedance detection device is connected to an electrical signal generator, the electrical signal receptor and analyzer (such as computer) so as to detect, analyze and process the impedance signal of target particles.

In the present disclosure, the sample channel (1) has a height substantially identical to or slightly greater than that of the main channel (4); and the sheath fluid channel (2) has a height substantially the same as or slightly greater than that of the convergence chamber (3). The "a height substantially identical to" means: the heights are exactly identical, or the difference in height is within an allowable range of the process; or although the heights are not identical, the height difference does not disturb the horizontal fluid flowing. The "slightly greater than" means the height difference is no greater than than 20%, such as the height difference is 20%, 15%, 10% or 5%.

The "convergence chamber" in the present disclosure is the structure formed by converging of the sheath fluid channel (2) and the sample channel (1), which may also be called "junction" or "intersection". As different channels meet from different directions and all of the channels possess a certain cross-sectional area, a chamber structure, for example, a cubic chamber, is accordingly formed at the intersection or junction.

In one embodiment of the present disclosure, the convergence chamber (3) is connected to the sample channel (1) as well as the sheath fluid channel (2) on one hand, and also connected to the main channel (4) on the other hand. The position where the chamber meets the sample channel and/or the sheath fluid channel (2) may be referred to as "inlet", and the position where the convergence chamber meets the main channel (4) may be referred to as "outlet". Furthermore, the heights of the sample channel, the sheath fluid channel, and/or the inlet of the convergence chamber, and/or the convergence chamber are sized to be higher than the heights of the outlet of the convergence chamber (3) and/or the main channel (4), so that a stepped design effect is formed between the convergence chamber and the main channel. Thus in one embodiment, the convergence chamber is also actually called a stepped channel.

As a result of the above designs, the sheath fluid cannot directly and smoothly flow into the main channel in the horizontal direction. On the contrary, part of the sheath fluid flow which horizontally exceeds the height of the outlet of the convergence chamber (3) (i.e., the height of the main channel) will change direction due to obstruction, so that a fluid flow which moves perpendicular to the surface of the chip is created in the convergence chamber, which further presses the sample flow in the vertical direction, so as to deflect and focus the sample flow passing through the main channel in the direction perpendicular to the surface of the chip.

In one embodiment, the top of convergence chamber (3) is higher than the that of main channel, so that when the sheath fluid flows into the main channel (4) through the sheath fluid channel (2) and the convergence chamber (3), a downward flow is produced, forcing the sample flow to move towards the lower side of the main channel.

In another embodiment, the bottom of convergence chamber (3) is lower than that of the main channel, so that when the sheath fluid flows into the main channel (4) through the convergence chamber (3), a upward flow is produced, forcing the sample flow to move towards the upper side of the main channel.

In another embodiment, the ratio of the height of the convergence chamber (3) to the main channel (4) is (1.5~5):1, preferably (1.5~3):1, such as 2:1.

In one embodiment, the heights of the sheath fluid channel and convergence chamber of the present disclosure are both 240 μm, and the heights of the sample channel and the main channel are both 120 μm.

As a result of the above designs, various effects of focusing the sample particle flow may be achieved by adjusting the flow rate ratio of the sample flow to the sheath fluid flow. For example, when the flow rate ratio of the sample flow to the sheath fluid flow is set as 1:4, the focused sample flow has a diameter of 30 μm.

Impedance Measurement Electrode

The principle of detecting and counting particles based on impedance is well known in the art: when the particles suspending in the electrolyte pass through a DC or an AC electric filed, an amount of electrolyte which has the same volume as the particles is replaced or partly replaced, causing transient variations of the resistance between two electrodes of the circuit, thereby producing a potential pulse. The intensity and number of pulse signal is proportional to the size and number of the particles, thereby being useful for the counting of various particles including blood cells.

Impedance measurement electrode (5) may be prepared on the surface of the substrate or the cover plate of the chip by conventional method in the art, such as photolithography, lift-off method, or magnetron sputtering method, etc. The material of the electrode may be any appropriate material, such as metals with low value of resistance and not easily oxidized, such as Pt, Au, etc, as well as transparent conductive materials such as indium tin oxide (ITO), etc.

It should be noted that in order to achieve the aim of the present disclosure, the impedance measurement electrode (5) may be disposed at different positions, as long as being compatible to the position toward which the sample flow is focused vertically. For example, if the target particles is closer to the lower side of the main channel (4) after 3D focusing, in order to obtain differentiable signals, the impedance measurement electrode (5) may be integrated at the bottom of the main channel (4), i.e., on the substrate.

On the contrary, if the target particles is closer to the upper side of the main channel (4) after 3D focusing, in order to obtain differentiable signals, the impedance measurement electrode (5) may be integrated at the top of the main channel (4), such as on the cover plate.

In the present disclosure, that the impedance measurement electrode (5) is at the bottom of the main channel (4) indicates the impedance measurement electrode (5) is disposed on the upper surface (i.e., the inner surface of the lower wall of the main channel), interior, or outer surface of the substrate of the chip at the bottom region of the main channel (4). That the impedance measurement electrode (5) is at the top of the main channel (3) indicates the impedance measurement electrode (5) is disposed on the lower surface, interior or upper surface of the cover plate above the main channel (4).

Impedance Analysis

Impedance analysis of cells is conducted by using the electrical characteristics (such as electrical conductivity and dielectric constant, etc.) of cell to describe the physiological conditions thereof. Physical and biological characteristics of the cell can be known from impedance analysis by establishing cell circuit model, which is based on the changes of impedance, dielectric property and conductivity under different voltage and frequency conditions, wherein the cell membrane is equivalent to capacitance and the cytoplasm is equivalent to resistance.

In one embodiment of the present disclosure, the impedance of cell has the following expression, $$Z=R+jX, X=X_L+X_C,$$

wherein, R is the resistance of cell, which is related to the cell size and material;

$X_L$ is inductive reactance, which is related to ion channels of cell membrane, and $X_L=2\pi f L$;

$X_C$ is the capacitive reactance, which is related to the thickness of cell membrane, and $X_C=(2\pi f C)^{-1}$; and Under low frequency condition, $X_C$ is larger than $X_L$, and $X_L$ is negligible. On the contrary, under high frequency condition, $X_L$ is larger than $X_C$ and $X_C$ is negligible. Viewing the cell as an electrical module, the internal resistance and the internal reactance of the cell are connected in parallel, so that the module exhibits a parallel connection of resistance and capacitance at high frequencies. In the present disclosure, the detection frequency range is related to $X_C$, and $X_L$ is negligible. Compared with other designs of the art in which, measurement is carried out based on the ratio between a high frequency and a low frequency, the impedance of various samples can be determined solely based on low frequency in the present disclosure, which greatly reduces the complexity of the detection circuit and the cost of the detection device.

In one embodiment of the present disclosure, the time constant of DC signal in electricity is denoted as $\tau$, while $\tau=RC$. When detection is carried out with AC, the time constant of alternating current $T_{AC}$ may be expressed as:

$$\tau_{AC}=R*C=R*(2\pi f X_C)^{-1}, \text{ i.e., } \tau_{AC}=R/(X_C*2\pi f);$$

in view of the above, r is directly related to $R/X_C$.

Based on the above derivation, the inventor surprisingly finds that if the calculation of $R/X_C$ value is included in the detection step, and a suitable cut-off value is selected, a more effective discrimination between various types of particles, such as A549 cells and PBMCs, can be achieved. Accordingly, in some embodiments of the present disclosure, $R/X_C$ value of the particles is calculated when the analyzing impedance signals.

In some embodiments, the optimal cut-off value of $R/X_C$ may be different due to the difference in the conductivity of the electrolyte and detection frequency. Besides, the applied voltage for the detection may influence the amplification and reduction of the signal, so that the optimal cut-off value may also vary. However, after reading the disclosure of the present disclosure and knowing that $R/X_C$ value can be used for a better discrimination of different cells, one skilled in the art will be able to determine a suitable cut-off value based on actual conditions of use.

In some embodiments, the cut-off value set according to the $R/X_C$ value ranges between 0.2 and 1.2.

In one embodiment, the cut-off value is 0.8.

In one embodiment, the impedance analysis distinguishes the A549 from PBMC cells based on $R/X_C$ value; in another embodiment, the impedance analysis is used for analyzing other samples, which can be successfully carried out as long as the impedance of samples with different characteristics is different, such as, the discrimination between various tumor cells and the blood sample, the discrimination of different types of white cells, and the determination of the existence of fungus/bacteria in the blood.

The microfluidic chip of the present disclosure is used to carry out detection and the impedance measurement electrode is used to measure the impedance, which includes two parts: resistance and reactance. The change in one of resistance and reactance or both will result in impedance changes. Specifically, a certain voltage is provided by a signal source for the electrodes (eg. two or three electrodes out of a group of electrodes), and the current at a certain frequency that flows through said electrodes and into the signal receiving electrode is detected, thus obtaining the impedance by dividing voltage amplitude value by current amplitude value with a computer. Consequently, different impedance values can be obtained for distinct samples in this calculation given appropriate voltages and frequencies, and used to make determination for different samples, combined with $R/X_C$ value calculated based on the obtained impedance value.

In one embodiment of the present disclosure, the voltage provided by the signal source ranges from 1 Vpp to 20 Vpp, and the current has a frequency of 10 kHz~1 MHz.

In a specific embodiment, the voltage for impedance detection is 3 Vpp, and the current frequency is 120 kHz.

Three-Dimensional Focusing

In the present disclosure, terms "three-dimensional focusing", "3D focusing", "3D fluid dynamics focusing" or "three-dimensional fluid dynamics focusing" have the same meaning, which indicate the phenomenon that when flowing through the microfluidic chip of the present disclosure, the sample flow is focused in the direction perpendicular to the chip in addition to the horizontal direction by the sheath fluid flow.

Correspondingly, terms "two-dimensional focusing", "2D focusing", "2D fluid dynamics focusing" or "two-dimensional fluid dynamics focusing" have the same meaning, which indicate the phenomenon that when flowing through the microfluidic chip, the sample flow is merely focused in the horizontal direction.

Example

Material and Method

Preparation of the Chip

The 3D focusing microfluidic chip as illustrated in FIG. 1 was prepared by conventional processes in the art. The chip comprises a sample channel (1) in the middle and two sheath fluid channels (2) on both sides. The three channels converged at the exit end to form convergence chamber (3), which is further connected to the main channel (4). The impedance measurement electrode (5) was connected to the signal receiver and analyzer.

At the same time, a conventional 2D focusing microfluidic chip was prepared. The difference between the 2D focusing chip and the above 3D focusing chip was that in the 2D focusing microfluidic chip, the height of the convergence chamber was substantially identical to that of the main channel.

Construction of A549 Cell Line with GFP Marker

Original cell line: A549 human non-small cell lung cancer cell strain was purchased from ATCC. The cell strain was derived from a 58-year-old white male patient with lung cancer, and established in 1972 by D. J Gard, etc.

DNA expression vector: pLEIN vector, comprising a bicistron that expresses EGFP and neomycin resistance gene, and an internal ribosome entry site (IRES).

Cell culture, vector production, transfection and subcloning: packaging cell strain PT67 derived from NIH3T3 that expresses 10AI virus envelope was purchased from Clontech Laboratories, Inc. The PT67 cells were cultured in DMEM supplemented with 10% heat inactivated fetal calf serum (Gemini Bio-products, Calabasas, Calif.). For producing the vector, a mixture of 70% covered packaging cells (PT67). DOTAP reagent and pLEIN plasmid precipitate with a saturation capacity was cultured for 18 hours, when fresh medium was supplemented. Cells were examined by fluorescence microscopy after 48 hours. The cells were cultured in 500~2000 µg/mL G418 (Life Technologies, Inc., Grand Island, N.Y.) for 7 days to select the GFP positive cells.

Retroviral transfection: A mixture of 20% covered A549 cells, retrovirus precipitate obtained by culturing PT67 cells and 10% fetal calf serum-containing PRMI1640 culture medium (Life Technologies Inc., the ratio of the two is 1:1) was cultured for 72 hours, when fresh medium was supplemented. 72 hours after transfection, A549 cells were harvested with trypsin/EDTA, and were passaged to a selective medium containing 200 µg/mL G418 at a ratio of 1:15. G418 was gradually increased to 800 µg/mL. Cell clones that express GFP were separated with trypsiniEDTA via cloning cylinder (Bel-Art Products. Pequannock. N.J.), and were expanded and transferred by conventional methods.

Culture: cells are cultured by conventional method, specifically: in a 10% fetal calf serum-containing MEM-α medium, the cells were cultured in an incubator with 5% carbon dioxide at 37° C. After 48 hours, the culture dish was taken out, the original medium was removed before trypsin-EDTA solution was added, and then the mixture was incubated at 37° C. for 1 minute. After the cells peeled off from the bottle wall, an appropriate amount of serum-containing fresh medium was added to terminate the effect of trypsin. The suspension was removed after centrifugation, and fresh medium was added to obtain the experimental cells.

Example 1 3D Focusing Chips could Generate More Stable Signals and Exhibited Higher Sensitivity The medium containing A549 cells was diluted to $2.5 \times 10^5$ cells/mL with 1×PBS buffer, from which 50 µL of A549 cells were taken, placed in 1.5 mL PBS+sucrose isotonic buffer (conductivity=150 mS/m), and injected into the sample channel (1) of the microfluidic chip in the present disclosure at a flow rate of 3.5 mL/hr. Meanwhile, an isotonic buffer comprised of PBS and sucrose (conductivity=150 mS/m) was used as the sheath fluid, which was injected into the sheath fluid channel (2) at a controlled flow rate of 10.5 mL/hr. The real-time impedance measurement results were shown. As the control, an equal amount of A549 cells were taken and passed through a 2D focusing microfluidic chip. The input voltage of impedance detection was 3 Vpp, and the frequency was 120 kHz.

Figure 2:
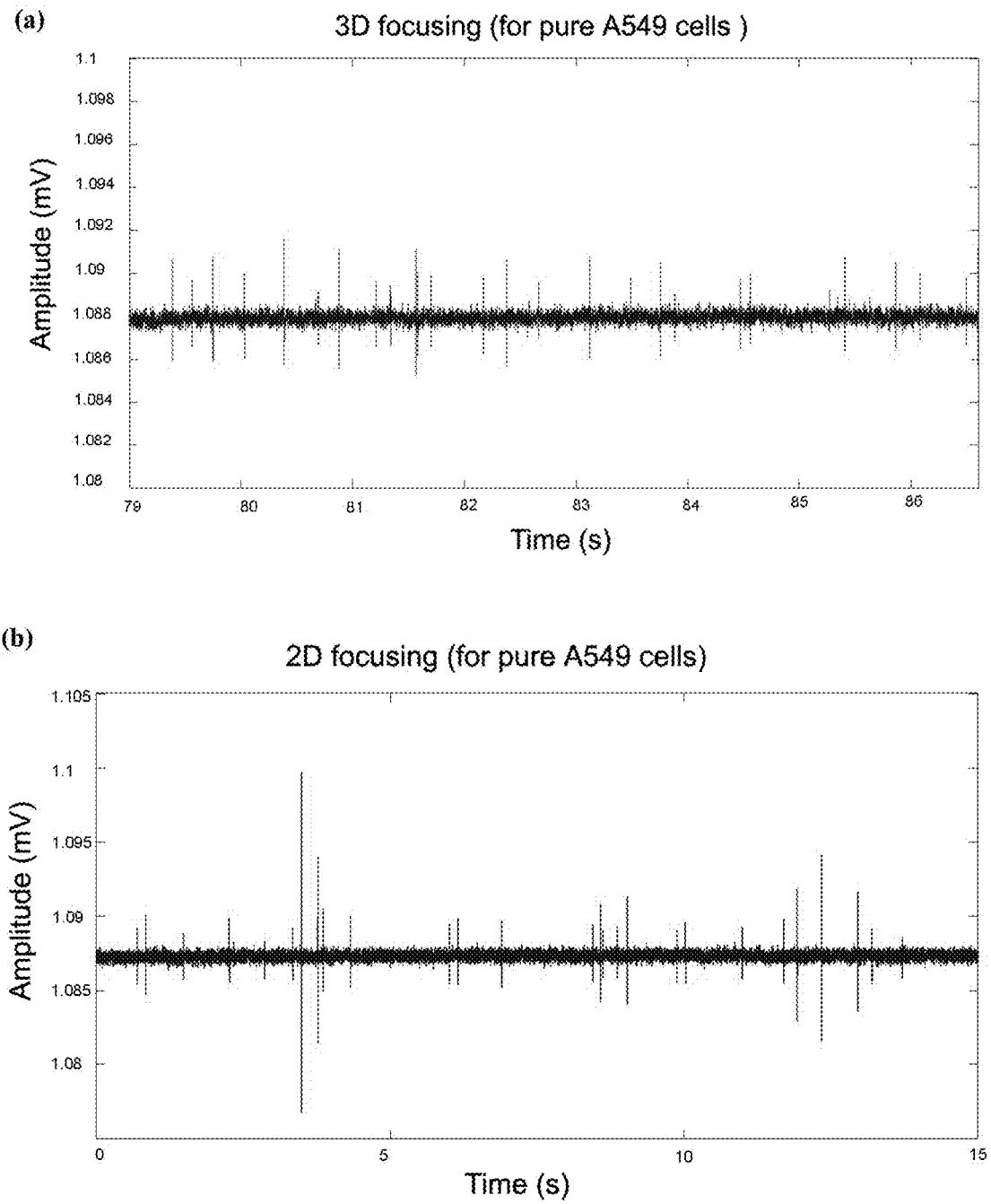
FIG. 2a and FIG. 2b show the real-time results of impedance detection of flowing A549 cells. The measurement electrode pair is disposed at the downstream of the chip following 2D/3D fluid dynamics focusing part. The signal detected by 2D focusing is not stable with large variations, and some of the higher peak values may be caused by multiple particles passing through the detection electrode at the same time. On the contrary, 3D focusing makes it possible to detect signals with smaller variations, and thus effectively differentiate single A549 cell from PMBC.
FIG. 2c shows the detection signal from A549 cells subjected to 3D focusing, which has lower standard deviation.
Figure 2:
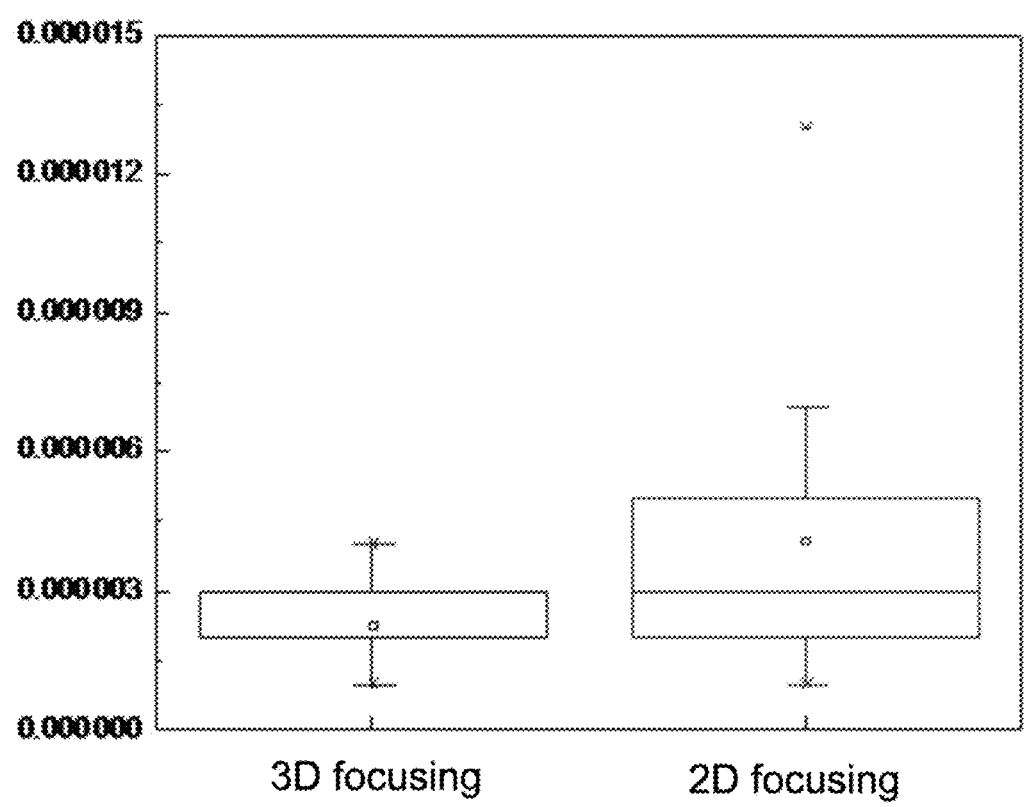

The results indicated that the signals detected by 2D focusing were not stable with large variations, some of the higher peak values may be caused by multiple particles passing through the detection electrode at a time. 3D focusing makes it possible to detect signals with smaller variations (FIG. 2*a* and FIG. 2*b*), and the detection signal from A549 cells subjected to 3D focusing had lower standard deviation (FIG. 2*c*).

Figure 3:
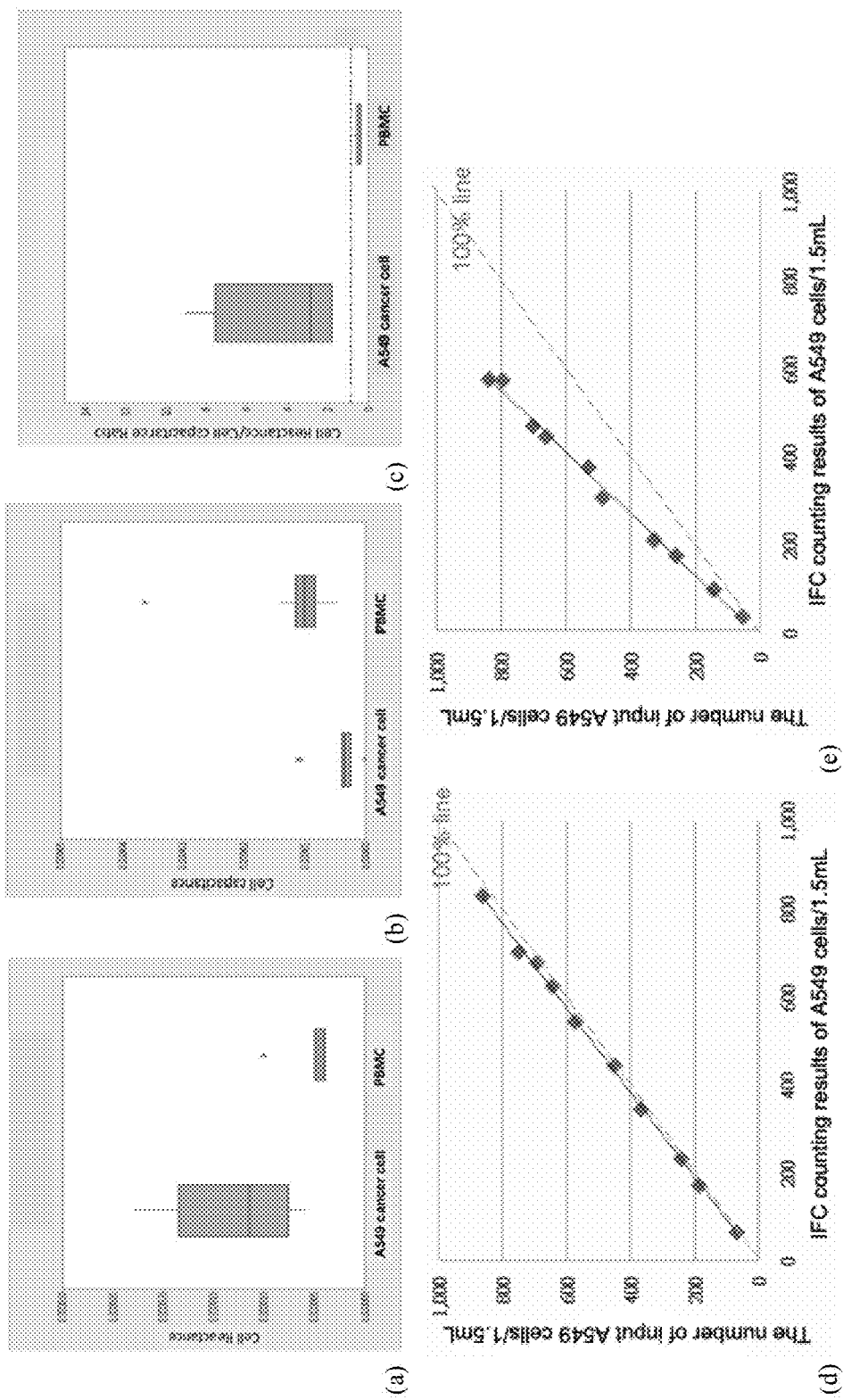
FIGS. 3(a) and (b) show the measurement of the reactance and capacitance of A549 cells and PBMCs that are subjected to 3D focusing, respectively. (c) Particle impedance signals are analyzed based on the particle polarization rate, i.e., the ratio of capacitance to conductivity. By setting a certain cutoff value (such as 0.8), A549 cells can be effectively distinguished from the PMBCs in the suspension medium. Impedance based 3D focusing chip enables accurate counting of A549 cells and elimination of non-target signals. (d and e) Comparison of the sensitivities of 3D and 2D focusing when detecting pure A549 cell sample. (d) The sensitivity of detection is up to 91~98% by combining 3D fluid dynamics focusing chip with analysis of cell polarization characteristics. (e) The sensitivity is merely 58~70% when two dimensional fluid dynamics focusing is carried out.

Furthermore, the difference of sensitivities between 2D focusing and 3D focusing in detecting target cells was compared. As described above, the A549 cells diluted to a concentration of $2.5 \times 10^5$ cells/mL with PBS buffer were used. A549 cells of distinct amounts were introduced into the microfluidic chip by way of taking different volumes or making further dilutions (in this example, the amount of cells injecting into the 3D focusing chip ranged from 50 to 800 cells, and the amount of cells injecting into the 2D focusing chip ranged from 50 to 620 cells). The number of positive signals detected by the microfluidic chip was recorded for each experiment, which was further divided by the input cell number to obtain the detection accuracy. The results indicated that the detection rate of 3D chip was as high as 91~98%, while the detection rate of 2D focusing chip was only 58~70% (FIGS. 3*d* and 3*e*). In view of above, the microfluidic chip based on 3D focusing design was able to respond to the signal from the target particles with higher sensitivity.

Example 2 Inclusion of Calculated R/Xc Value Improved the Ability of the 3D Chip to Distinguish Different Cells The medium containing A549 cells was diluted to $1 \times 10^4$ cells/mL with 1×PBS buffer, from which 50 µL of A549 cells were taken. Meanwhile, the blood of a normal person was taken, subjected to equal density centrifugation (Ficoll), $10^7$ PMBCs were obtained. The diluted A549 cells and PBMCs were placed in 1.5 mL PBS+sucrose isotonic buffer (conductivity=150 mS/m), respectively, and injected into the sample channel (1) of the 3D focusing microfluidic chip at a flow rate of 3.5 mL/hr. Meanwhile, an isotonic buffer comprised of PBS and sucrose (conductivity=150 mS/m) was used as the sheath fluid, which was injected into the sheath fluid channel (2) at a controlled flow rate of 10.5 mL/hr. The impedance measurement electrode (5) was used for the detection. The resistance, capacitance and resistance/capacitance value were calculated based on the detected signals.

As can be seen from FIG. 3*a-c*, A549 cells and PMBCs exhibited significant differences in both resistance and capacitance. However, if taking standard deviation into consideration, when it comes to a particular cell, miscount may be produced. If the ratio of resistance to capacitance was further calculated, and a suitable cutoff value (indicated by the dashed line in FIG. 3*c* with the value of 0.8 in this example) was selected, the difference between A549 cell and PMBC were further amplified, so as to achieve a more distinct discrimination. As a result, 3D focusing microfluidic chip was able to effectively distinguish A549 cells from PBMCs in suspension medium and specifically count A549 cells. Accordingly, 3D focusing chip based on impedance was able to accurately count A549 cells and eliminate non-target signals.

Example 3 3D Focusing Chip was Able to Accurately Detected the Target Cells from a Mixed Sample A certain number (from 10 to 1000) of A549 cells were added into 1.5 mL PBMC sample containing about $10^7$ cells (5 mL of whole blood dissolved in 1.5 mL PBS+sucrose isotonic buffer (conductivity=150 mS/m) after being subjected to Ficoll centrifugation), to obtain a series of cell mixtures having different A549 cell concentrations, which were further injected into the sample channel (1) of 3D focusing microfluidic chip or 2D focusing microfluidic chip at a rate of 3.5 mL/h, respectively At the same time, an isotonic buffer comprised of PBS and sucrose (conductivity=150 mS/m) was used as the sheath fluid, and injected into the sheath fluid channel (2) at a controlled flow rate of 10.5 mL/hr. Then the impedance counting was carried out and the difference between the counted cell number and the input A549 cell number in the sample was determined in the context of 2D focusing and 3D focusing, respectively. The cutoff value of $R/X_C$ was 0.8 for the detection.

Figure 4:
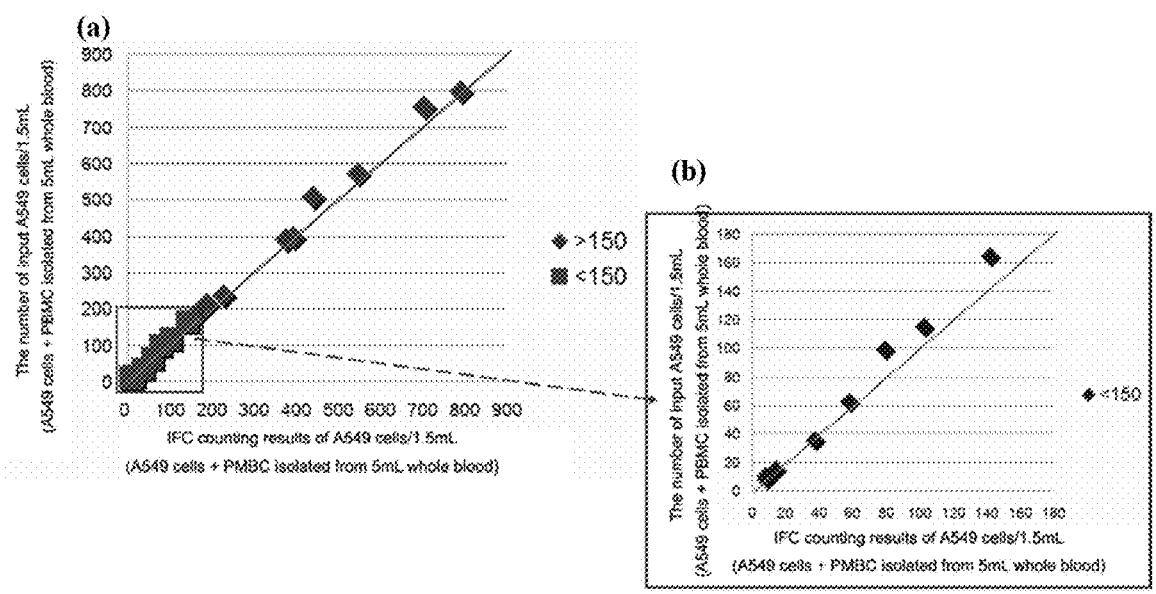
FIG. 4 shows that the detection of A549 cells subjected to 3D focusing is not interfered by other cells. A certain amount of A549 cells are added in a sample containing about $10^7$ PMBCs, and the accuracy of detecting A549 cells subjected to 3D focusing is calculated. It can be seen from the figure that the accuracy of detection is above 90%. (b) is a partially enlarged view of (a).

The results indicated that the detection of A549 cell using 3D focusing microfluidic chip was not influenced by the presence of PBMC cells in the sample, and the number of A549 cells in the sample could still be accurately measured (FIG. 4a, comparing the curves in FIG. 4a and FIG. 3d), with a detection rate of above 90%. In addition, even if the proportion of A549 cells in the mixture was very low (for example, the input A549 cell number was below 200), the 3D focusing microfluidic chip was still able to accurately detect the positive signals with rare missing (FIG. 4b). On the contrary, since 2D focusing microfluidic chip was not able to distinguish A549 cell signals from PBMC signals, the counting results were very unstable, making it hard to obtain a linear relationship between the input cell and the detection result (thus the results were not shown herein). It can be seen that the 3D focusing microfluidic chip had good immunity to interference and discrimination for target cells. In practical application, a large number of test samples were in the form of mixtures, therefore, the 3D focusing microfluidic chip of the present disclosure and the detection method using the same have significantly better value.

What is claimed is:

1. A method for detecting particles, comprising
   a) injecting a test sample containing the particles into microfluidic chip;
   b) detecting an impedance signal of the particles; and
   c) analyzing the impedance signal obtained in step b) to distinguish a target particle from a non-target particle; and wherein
   the microfluidic chip for detecting particles, comprising an inlet unit, a main channel (4) and an impedance detection unit,
   the inlet unit comprises one or more sample channels (1), and one or more sheath fluid channels (2), such as 1, 2 or 3 sample channels and 1, 2, 3, 4, 5 or 6 sheath fluid channels, and for more example, one sample channel and two sheath fluid channels, and the one or more sample channels (1) and one or more sheath fluid channels (2) converge at one end to form a convergence chamber (3), and the convergence chamber (3) is connected to the main channel (4), so that a sample flow and a sheath fluid flow meet and then flow into the main channel (4); and
   the impedance detection unit comprises an impedance measurement electrode (5), which is disposed at the top or the bottom of the main channel (4), capable of generating an impedance detecting signal in response to the particles flowing through the main channel (4);
   at the interface between the convergence chamber (3) and the main channel (4), the convergence chamber (3) has a height greater than that of the main channel (4), so that when the sheath fluid flows into the main channel (4) from the sheath fluid channel (2) and through the convergence chamber (3), a flow perpendicular to the direction of the surface of the chip is produced; and
   the ratio of the height of the convergence chamber (3) to that of the main channel (4) is 1.5-5:1; and
and wherein
   in step c), the analysis comprises calculating the ratio of resistance (R) to capacitive reactance (Xc) of the particles based on the impedance signals obtained in step b), determining a cut-off value and distinguish the target particles from non-target particles, wherein the cut-off value of R/Xc ranges between 0.2 and 1.2.

2. The method according to claim 1, comprising
   a) injecting the test sample and sheath fluid into the inlet unit respectively through the sample channel (1) and the sheath fluid channel (2), respectively, the sample is derived from whole blood, plasma, urine, tissue fluid, cerebrospinal fluid, cell culture fluid or cell mixture;
   b) detecting the impedance signal of the flowing-through particles with the impedance detection unit; and
   c) analyzing the impedance signal obtained in step b) to distinguish the target particles from non-target particles, wherein the target particles are tumor cells.

3. The method according to claim 2, wherein the flow rate ratio of sample flow to the sheath fluid flow is 1:1~1:10.

4. The method according to claim 1, wherein the top of the convergence chamber (3) is higher than that of the main channel (4), so that when the sheath fluid flows into the main channel (4) from the sheath fluid channel (2) and through the convergence chamber (3), a downward flow is produced.

5. The method according to claim 1, wherein the bottom of the convergence chamber (3) is lower than that of the main channel (4), so that when the sheath fluid flows into the main channel (4) from the sheath fluid channel and through the convergence chamber (3), a upward flow is produced.

6. The method according to claim 1, wherein the sheath fluid channel (2) has a height substantially the same as or slightly greater than that of the convergence chamber (3).

7. The method according to claim 1, wherein the sample channel (1) has a height substantially the same as or slightly greater than that of the main channel (4).

8. The method according to claim 1, wherein the ratio of the height of the convergence chamber (3) to that of the main channel (4) is 1.5-3:1.

9. The method according to claim 1, wherein the ratio of the height of the convergence chamber (3) to that of the main channel (4) is 2:1.

10. The method according to claim 1, wherein the impedance measurement electrode (5) is disposed at the bottom of the main channel (4).

11. The method according to claim 1, wherein the impedance measurement electrode (5) is disposed at the top of the main channel (4).

12. The method according to claim 1, wherein the cut-off value is 0.8.

13. The method according to claim 2, wherein the sheath fluid is a sucrose PBS solution.

14. The method according to claim 2, wherein the sheath fluid comprises 280 mM sucrose, 137 mM NaCl, 2.7 mM KCl, 4.3 mM Na2HPO4 and 1.47 mM KH2PO4, pH of 7.4.

15. The method according to claim 2, wherein the sheath fluid has a conductivity of 30~500 mS/m.

16. The method according to claim 2, wherein the sheath fluid has a conductivity of 150 mS/m.

17. The method according to claim 2, wherein the target particles are circulating tumor cells.

\* \* \* \* \*